US007208220B2

(12) United States Patent
Yamasaki et al.

(10) Patent No.: US 7,208,220 B2
(45) Date of Patent: Apr. 24, 2007

(54) FIBER-REINFORCED COMPOSITE MATERIAL AND METHOD FOR PRODUCTION THEREOF

(75) Inventors: Masaaki Yamasaki, Ehime (JP); Akihiko Kitano, Ehime (JP); Tomoyuki Shinoda, Ehime (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/497,505

(22) PCT Filed: Dec. 4, 2002

(86) PCT No.: PCT/JP02/12699

§ 371 (c)(1), (2), (4) Date: Jun. 3, 2004

(87) PCT Pub. No.: WO03/047830

PCT Pub. Date: Jun. 12, 2003

(65) Prior Publication Data

US 2005/0053787 A1 Mar. 10, 2005

(30) Foreign Application Priority Data

Dec. 6, 2001 (JP) ............................ 2001-372911
Feb. 22, 2002 (JP) ............................ 2002-046207

(51) Int. Cl.
*B32B 25/02* (2006.01)
*B32B 30/00* (2006.01)
*B29C 67/00* (2006.01)

(52) U.S. Cl. .................... 428/296.4; 428/57; 264/136; 264/137; 264/257

(58) Field of Classification Search ............... 428/543, 428/57, 375, 294, 296.4; 264/137, 257, 274, 264/279, 136
See application file for complete search history.

(56) References Cited

U.S. PATENT DOCUMENTS 4,242,406 A * 12/1980 El Bouhnini et al. ....... 442/373
4,483,904 A * 11/1984 Church ....................... 428/543

FOREIGN PATENT DOCUMENTS

JP 6-298948 A 10/1994
JP 2001-294688 A 10/2001

* cited by examiner

*Primary Examiner*—N. Edwards
(74) *Attorney, Agent, or Firm*—DLA Piper US LLP

(57) ABSTRACT

A fiber-reinforced composite material including reinforcing fibers and a matrix resin, wherein at least some of the reinforcing fibers have their ends in the matrix resin, and a second resin having an elastic modulus less than that of the matrix resin is present in contact with fiber ends of at least some of reinforcing fibers having above-mentioned ends and only in the neighborhood thereof.

13 Claims, 2 Drawing Sheets

5a
3
2a
2
4
5
5b
1

FIBER-REINFORCED COMPOSITE MATERIAL AND METHOD FOR PRODUCTION THEREOF

TECHNICAL FIELD

The present invention relates to a fiber reinforced composite material suitable for lightweight high-strength structural members of, for example, aircraft and motor vehicles, and also relates to a production method thereof.

BACKGROUND ART

Fiber-reinforced composite materials having resins reinforced by fibers are widely used in such fields as aircraft, motor vehicles and architecture because of their excellent lightweight and high strength properties.

For obtaining a member made of a fiber-reinforced composite material having a higher strength, it is preferred that the reinforcing fibers coexist with a resin as continuous fibers having no fiber ends therein.

However, continuous fibers are unlikely to be deformed or to migrate when the composite material containing them is molded. For this reason, there can be cases where it is difficult to produce members having, for example, greatly rugged shapes or complicated shapes by molding. In such cases, when a woven fabric composed of continuous fibers is used, it is practiced to form rifts partially in the woven fabric or to remove a portion of the woven fabric, for cutting fibers to have adequate lengths, thereby assuring a degree of freedom in the deformation and mobility of the woven fabric.

In this case, even though the fiber-reinforced composite material uses continuous fibers for reinforcing, the composite material contains the ends of reinforcing fibers therein. As described later, stress concentration occurs near the ends of reinforcing fibers, and can cause the member made from the composite material to be fractured from near the ends. If a molded composite material is fractured at or near fiber ends contained therein, the strength of the composite material becomes lower than the expected strength.

On the other hand, in the case where a member having a more complicated shape is going to be produced, discontinuous fibers having a fiber length of several millimeters to tens of millimeters (usually called short fibers) are used as the reinforcing fibers, to facilitate the mobility and deformation of the reinforcing fibers when the composite material is produced by molding. The obtained composite material is called a short fiber-reinforced composite material.

A typical short fiber-reinforced composite material is called SMC (sheet molding compound). SMC is a sheet-like intermediate base material produced by arranging reinforcing fibers cut to a length of about 10 mm to about 30 mm in one direction or at random on a resin film used as a matrix resin, and further overlaying another resin film on them. The base sheet is placed in a mold installed in a press, pressurized and thermally cured for molding into a bonnet of a motor vehicle, or a housing member such as a bathtub. SMC is used when a member having a complicated shape is produced by means of molding.

However, the short fiber-reinforced composite material has such disadvantages that its strength is lower than one half of the strength of a continuous fiber-reinforced composite material and that its weight is heavier than that of the continuous fiber-reinforced composite material.

The reason why a short fiber-reinforced composite material has a strength lower than that of a continuous fiber-reinforced composite material is that the resin (matrix resin) existing near the fiber ends is fractured. In this case, the reinforcing fibers per se are not fractured, but pulled out from the matrix resin, causing the entire member to be fractured. It is explained in "Composite Material Engineering" edited by Takeshi Hayashi, Union of Japanese Scientists and Engineers, pages 35–36 that in the case where a tensile force acts on a composite material, stress concentration occurs in the matrix resin portions positioned near the ends of reinforcing fibers.

Also in the case where a member is used for a long period of time, if external forces repetitively act on the fiber-reinforced composite material having fiber ends therein, it can happen that the matrix resin is cracked near the fiber ends of the reinforcing fibers, or the matrix resin is separated from the reinforcing fibers, and that the cracking or separation propagates to result in the fracture of the entire member.

As described above, a fiber-reinforced composite material having fiber ends has a problem that since it is fractured from near the fiber ends, the intrinsic properties of the reinforcing fibers cannot be sufficiently transferred.

In view of the problems as described above, it would be advantageous to provide a lightweight high-strength fiber-reinforced composite material though it contains fiber ends therein, and also to provide a production method thereof.

SUMMARY OF THE INVENTION

A fiber-reinforced composite material, which comprises reinforcing fibers and a matrix resin, wherein at least some of the reinforcing fibers have their fiber ends in the matrix resin (first resin), characterized in that a second resin having an elastic modulus lower than that of the matrix resin exists in contact with and only near the fiber end portions of at least some of the reinforcing fibers having fiber ends.

In the fiber-reinforced composite material, it is preferred that an extent of existing of the second resin is in the range of 30 times to 1,000 times of a diameter of the fiber at the fiber end portion from the fiber end of the fiber end portion.

In the fiber-reinforced composite material, it is preferred that the elongation of the second resin is higher than that of the matrix resin.

In the fiber-reinforced composite material, it is preferred that the strength of the second resin is higher than that of the matrix resin.

In the fiber-reinforced composite material, it is preferred that the fracture toughness value of the second resin is larger than that of the matrix resin.

In the fiber-reinforced composite material, it is preferred that the reinforcing fibers are carbon fibers.

In the fiber-reinforced composite material, it is preferred that the matrix resin is an epoxy resin.

The invention also includes a method for producing the fiber-reinforced composite material.

A method for producing a fiber-reinforced composite material, in which a fiber-reinforced composite material is produced by molding reinforcing fibers and a matrix resin, with at least some of the reinforcing fibers having their fiber end portions in the matrix resin, comprising the steps of positioning a second resin having an elastic modulus lower than that of the matrix resin in contact with and only near the fiber end portions of at least some of the reinforcing fibers having fiber ends, and subsequently molding for producing a fiber-reinforced composite material.

In the method for producing a fiber-reinforced composite material, it is preferred that the reinforcing fibers are short fibers obtained by cutting, and that the method comprises the step of letting the second resin adhere in contact with and only near the fiber end portions of the short fibers, the step of molding the short fibers having the second resin adhering thereto and the matrix resin into a sheet, and the step of pressurizing and heating the formed sheet for curing the resin.

In the method for producing a fiber-reinforced composite material, it is preferred that the reinforcing fibers are continuous fibers having cut ends, and that the method comprises the step of letting the second resin adhere in contact with and only near the end portions of the cut ends of the continuous fibers, the step of forming the continuous fibers having the second resin adhering thereto, into a state suitable for a desired shape of a member, the resin transfer molding step of injecting the matrix resin into the transformed continuous fibers, and the step of curing the resin of the molded article obtained by the resin transfer molding step.

In the method for producing a fiber-reinforced composite material, it is preferred that the method comprises the step of cutting a prepreg comprising the reinforcing fibers and the matrix resin, the step of letting the second resin adhere in contact with and only near the cut end portions of the cut reinforcing fibers, the step of laminating plural sheets of the prepreg having the second resin adhering thereto, and the step of curing the resin of the laminated prepreg in an autoclave.

In the method for producing a fiber-reinforced composite material, it is preferred that the reinforcing fibers are carbon fibers.

In the method for producing a fiber-reinforced composite material, it is preferred that the matrix resin is an epoxy resin.

MEANINGS OF THE SYMBOLS IN THE DRAWINGS

1: fiber-reinforced composite material; 2: fiber end portion; 2*a*: fiber end; 3: reinforcing fiber; 4: matrix resin (first resin); and 5, 5*a*, 5*b*: second resin.

The Best Modes for Carrying out the Invention

The invention is described below in more detail in reference to examples, comparative examples and attached drawings.

Figure 1:
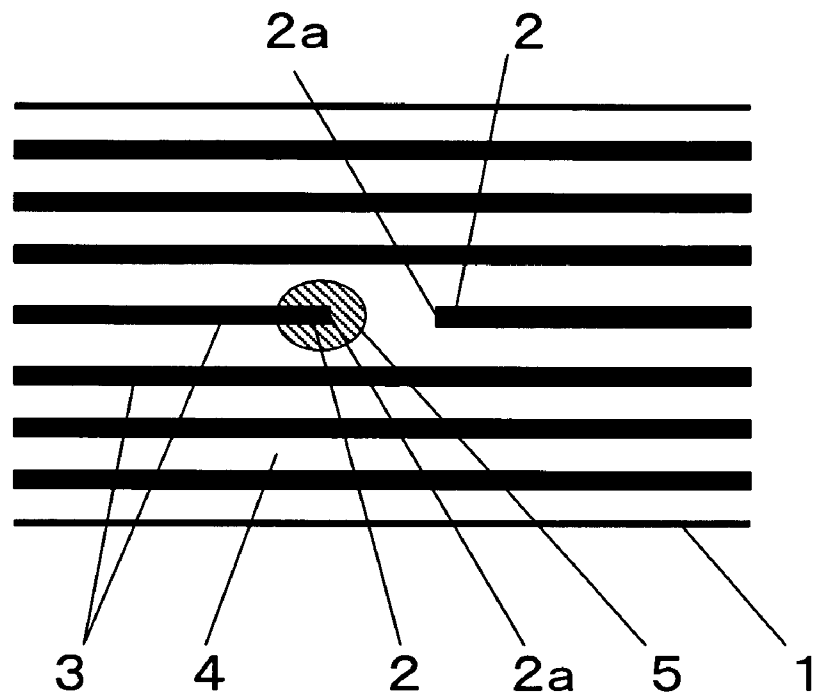
FIG. 1 is a typical view of a section in the direction perpendicular to the thickness direction showing an embodiment of the fiber-reinforced composite material of the invention.
Figure 2:
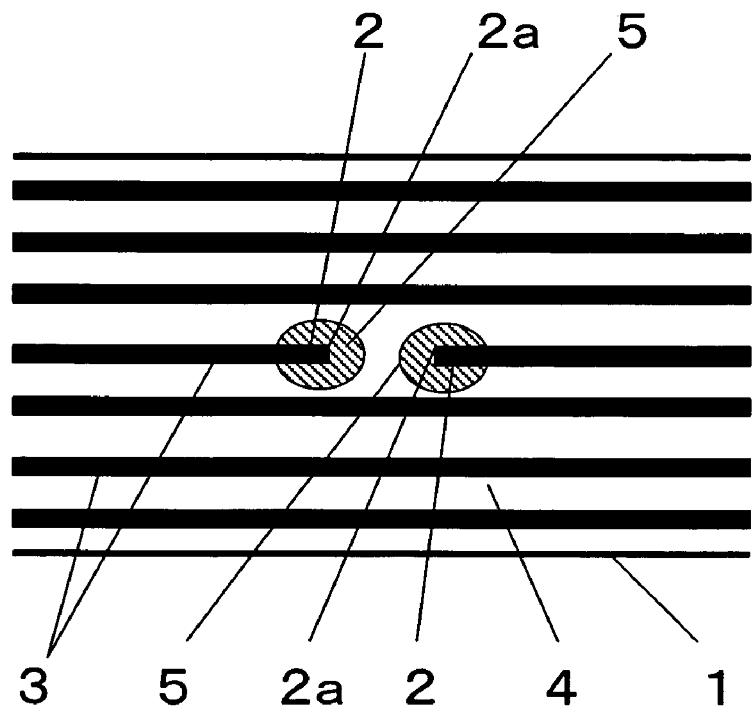
FIG. 2 is a typical view of a section in the direction perpendicular to the thickness direction showing another embodiment of the fiber-reinforced composite material of the invention.

In FIGS. 1 and 2, a fiber-reinforced composite material 1 of the invention comprises reinforcing fibers 3, and a matrix resin 4 as a first resin, and at least some of the reinforcing fibers 3 have their fiber ends 2*a* in the matrix resin 4. In the fiber-reinforced composite material 1, a second resin 5 having an elastic modulus lower than that of the matrix resin 4 exists in contact with and only near the fiber end portions 2 of at least some of the reinforcing fibers 3 having fiber ends 2*a*. FIG. 1 shows a mode in which the second resin 5 exists at one fiber end portion 2 out of the two fiber end portions 2 existing in the composite material in the illustrated section. FIG. 2 shows a mode in which the second resin 5 exists at both the two fiber end portions 2 existing in the composite material 1 in the illustrated section.

The length of the reinforcing fibers 3 having fiber ends 2*a* is in a range from a few millimeters to tends of millimeters. The reinforcing fibers 3 having fiber ends 2*a* are distributed regularly or at random in the matrix resin 4. As for the relation between the fiber end portions 2 and the second resin 5 existing in contact with and only near the fiber ends 2, if each of the reinforcing fibers 3 having fiber end portions 2 is a matchstick, the second resin 5 corresponds to a chemical composition covering and adhering to the tip of the matchstick. In the section shown in FIG. 1, one matchstick is shown. In the section shown in FIG. 2, two matchsticks facing each other are shown.

In general, if an external force (for example, a tensile force) acts on the fiber-reinforced composite material 1, a stress is transferred between the matrix resin and the reinforcing fibers 3. Though the composite material 1 has a strength that is higher than that of the matrix resin having no reinforcing fibers 3 therein, however, near the fiber ends 2*a* of the reinforcing fibers 3, large shearing stresses occur in the resin 4, depending on the elastic modulus of the matrix resin 4, and fracture begins from near the fiber ends 2*a*.

However, in the fiber-reinforced composite material 1 of the invention, since the second resin 5 having an elastic modulus lower than that of the matrix resin 4 exists near the fiber ends 2*a*, the stress concentration is reduced to prevent the composite material 1 from being fractured, or to retard the fracture, allowing the composite material 1 to maintain a high strength.

The second resin 5 must exist near the fiber ends 2*a* where stress concentration occurs. As a result of FEM (Finite Element Method) analysis, it was found that the stress concentration occurred in an extent of about 30 times the fiber diameter from the fiber ends 2*a* in the longitudinal (axial) direction of the fibers. According to this finding, it is preferred that the second resin 5 exists in an extent of at least 30 times of a diameter of the fiber. If the reinforcing fibers 3 are carbon fibers, the fiber diameter is usually in a range of 5 to 10 μm, and therefore it is preferred the length where the second resin 5 is made to adhere is in a range of 150 to 300 μm from the fiber end 2*a*.

On the other hand, if the extent in which the second resin 5 exists becomes large, the length of the contact between the matrix resin 4 and each of the reinforcing fibers 3 decreases, and the stress cannot be sufficiently transferred. As a result, it can happen that the strength of the composite material 1 declines. Therefore, it is preferred that the extent where the second resin 5 exists is not more than 1,000 times of a diameter of the fiber. Furthermore, it is preferred that the extent where the second resin 5 exists occupies the surface area corresponding to ⅓ or less, more preferably ⅕ or less of the surface area of the extent where the matrix resin 4 exists, i.e., the contact area between the matrix resin 4 and the reinforcing fibers 3.

The second resin 5 can be made to exist in the matrix resin 4, if a resin having an elastic modulus lower than that of the matrix resin is made to adhere to the fiber end portions 2 of the reinforcing fibers 3 beforehand.

Furthermore, the second resin 5 can be made to exist in the matrix resin 4, if a substance capable of reacting with the matrix resin 4 for lowering the elastic modulus of the matrix resin in the portions of the reaction is made to adhere to the fiber end portions 2 of the reinforcing fibers 3 beforehand.

It is not necessary that the second resin 5 should exist independently for each of the fiber end portions 2. As indicated by the second resin 5*a* shown in FIG. 3, the second resin 5 can exist to cover plural fiber end portions 2 adjacent to each other. Furthermore, as indicated by second resin 5*b* in FIG. 3, the second resin 5 can exist to cover the fiber end portions 2 of each fiber bundle consisting of plural fibers such as a strand or roving existing as a component of the reinforcing fibers 3.

If the elongation and strength of the second resin 5 are higher, the fracture occurring from near the fiber ends 2*a* can be reliably inhibited. As a result, the composite material (member) 1 can have a higher strength.

If the fracture toughness value of the second resin 5 is larger, the propagation of cracking is inhibited even if cracking occurs. As a result, the durability including fatigue resistance of the member 1 can be improved.

The reinforcing fibers 3 can be any fibers, if they are fibers having a high strength and a high elastic modulus. Examples of the reinforcing fibers 3 include inorganic fibers such as glass fibers, carbon fibers, alumina fibers and ceramic fibers, metallic fibers such as steel wires and copper wires, organic fibers such as aramid fibers ("Kevlar" (trademark), "Twaron" (trademark)), PBO (Poly(p-phenylene-2, 6-benzobisoxazole)) fibers, and ultra-drawn polyethylene fibers ("Spectra" (trademark), "Dyneema" (trademark)), and mixed fibers of these inorganic, metallic and organic fibers.

Above all, carbon fibers are excellent in strength and elastic modulus. Therefore, including at least carbon fibers in the reinforcing fibers 3 is most preferred, since the composite material 1 can have a lighter weight and a higher strength. In the case where the composite material is applied as a member for a motor vehicle, aircraft or the like, it is preferred that the carbon fibers have an elastic modulus of 200 to 600 GPa and a strength of 3.5 to 6.0 GPa.

Glass fibers are also excellent in cost performance and desirable as the reinforcing fibers for automobile members and architectural members in need of cost reduction.

The reinforcing fibers 3 can be provided in any of various modes, for example, as a strand or roving formed by paralleling continuous fibers or discontinuous fibers (short fibers) in one direction, cloth such as woven fabric or mat, braids, unidirectional, bi-directional, random, pseudo-isotropic or three-dimensionally dispersed mat-like material, heterogeneous lattice or mesh material, three-dimensional material such as triaxially woven fabric, etc.

An especially preferred mode of reinforcing fibers for a complicatedly shaped member as used in a motor vehicle is short fibers having a length of 5 to 30 mm. These short fibers can be oriented regularly in one direction, two directions, pseudo-isotropic manner, or at random in a highly rugged place.

In the case where the composite material is used for aircraft, architecture or the like, a unidirectional material comprising continuous fibers or a woven fabric is the most suitable reinforcing fibers. For a complicatedly shaped portion, a woven fabric once cut is used. Furthermore, usable is a woven fabric partially hollowed out and having another woven fabric joined or overlapped in the hollowed-out portion, or a woven fabric having a mat of short fibers added or covered with a patch in the hollowed-out portion.

Irrespective of whether the member is used in a motor vehicle or aircraft, it is preferred that at least 25% of the reinforcing fibers are arranged in the direction in which the strength is needed, since the strength can be improved.

Examples of the matrix resin include thermosetting resins such as epoxy resins, polyester resins, vinyl ester resins, phenol resins and urethane resins, thermoplastic resins such as polyamides (nylons), polyphenylene sulfide (PPS), polyethylene, polypropylene (PP), polystyrene, acrylonitrile styrene butadiene copolymer (ABS), polyvinyl chloride, polycarbonates, polyethylene terephthalate (PET), polybutylene terephthalate (PBT), and styrene acrylonitrile copolymer, alloy resins obtained by mixing these resins, modified resins, etc.

For the purpose of effectively transferring the stress to the reinforcing fibers 3, to let the composite material exhibit a higher strength, it is preferred to use an epoxy resin or its modified resin excellent in adhesion to the reinforcing fibers 3 as the matrix resin 4.

In the case where the composite material is used as a member having high impact resistance such as an automobile member, a thermoplastic resin such as a nylon or polypropylene is preferred. Since a thermoplastic resin also allows easy recycling, it is suitable also for mass-produced members such as parts of general motor vehicles.

The elastic modulus of the matrix resin 4 also affects the stress transfer to the reinforcing fibers 3. If the elastic modulus is higher, a larger stress can be transferred.

However, if the elastic modulus becomes higher, the residual stress due to heat shrinkage also becomes large. From the viewpoint of obtaining a balanced high-strength composite material, it is preferred that the elastic modulus is in a range from 1.5 to 7 GPa. A more preferred range is from 3 to 5 GPa. The elastic modulus of the matrix resin 4 can be measured according to JIS K 7113 or the nano-indentation method described later.

It is preferred that the elongation of the matrix resin 4 is higher than that of the reinforcing fibers 3, since the composite material 1 can have a higher strength. If the matrix resin 4 is fractured before the reinforcing fibers 3, the stress is cannot be transferred, and the strength declines. It is preferred that the elongation of the matrix resin 4 is in a range from about 1.2 to about 10 times the elongation of the reinforcing fibers 3. The elongation of the matrix resin 4 can be higher than the upper limit value, but it is wasteful, since the reinforcing fibers 3 are fractured before the matrix resin 4 is elongated to such a level. The elongation and strength of a resin are measured according to JIS K 7113 or ASTM D638.

It is preferred that the fracture toughness value of the second resin 5 is larger than that of the matrix resin 4, since the fracture near the fiber end portions 2 where the second resin 5 exists can be retarded to also retard the fracture of the member 1. As a result, the strength of the member 1 can be further improved.

Particularly, it is preferred that the fracture toughness value of the second resin 5 is not lower than 1.3 times the fracture toughness value of the matrix resin 4. More particularly, the fracture toughness value of the second resin 5 is 100 $J/m^2$ or more, more preferably 150 $J/m^2$ or more. The fracture toughness value of a resin is measured based on ASTM E399 (Compact Test Standard). The fracture toughness value is also called the energy release rate (G1c). The fracture toughness value refers to a value relating to the resistance force of a resin against crack propagation.

Methods for enhancing the elastic modulus and elongation of the matrix resin 4 include alloying techniques such as blending a thermoplastic resin with a thermosetting resin, and resin modification techniques such as adding a rubber to a thermosetting resin. Furthermore, methods of adding carbon nano-tubes, filler such as clay mineral or ceramic particles such as silica particles or silicon carbide particles to a resin also allow the elastic modulus and elongation of the matrix resin to be adjusted.

Fibers preferred as the reinforcing fibers 3 are carbon fibers or glass fibers that have such brittleness as to allow fiber ends 2*a* to be easily formed by cutting. Above all, carbon fibers having the strength of 3 to 6 GPa are preferred to obtain a lightweight high-strength member 1. The strength, elastic modulus and elongation of fibers can be measured according to JIS R 7601. The diameter of fibers is measured at a magnification of 1,000 times using an electron microscope. An optical microscope can also be used similarly for measuring the diameter. The diameter can also be calculated from the circular section assumed from the weight of the fibers per unit length and the specific gravity of the fibers.

The fiber ends 2*a* of the reinforcing fibers 3 can be formed also by such a method as breaking, shaving or laser processing, in addition to by cutting. The fiber ends 2*a* can be formed by working the reinforcing fibers 3 individually or by cutting respective fiber bundles such as strands or rovings. The end face of each fiber end 2*a* can be rugged or flat. The end face of each fiber end 2*a* can be virtually perpendicular (90°) to the axial direction (longitudinal direction) of each fiber or has an angle to some extent (about 90° to about 20° to the axial direction).

The fiber ends 2*a* can exist at random in the composite material 1 or regularly to some extent or as sets, as occurring when they are cut as bundles.

It is preferred that the rate of the reinforcing fibers 3 having fiber ends 2*a* in the composite material 1 is larger if the shape of the member 1 is more complicated. Like a short fiber-reinforced composite material, all the reinforcing fibers 3 can have fiber ends 2*a*. The reinforcing fibers 3 having fiber ends 2*a* can be uniformly distributed in the member or can exist locally in complicatedly shaped portions, etc.

As described before, near the fiber end portions 2 of the reinforcing fibers 3 having fiber ends 2*a*, large shearing forces occur in the matrix resin 4, to fracture the matrix resin 4, not allowing stresses to be transferred to the fibers, and the member 1 as a whole is fractured. However, in the fiber-reinforced composite material 1 of the invention, since the second resin 5 having an elastic modulus lower than that of the matrix resin 4 exists near the fiber end portions 2, the fracture from near the fiber end portions 2 can be prevented or retarded. Thus, the member 1 has a high strength.

Examples of the second resin 5 include, like the above-mentioned matrix resin 4, thermosetting resins such as epoxy resins, polyester resins, vinyl ester resins and phenol resins, thermoplastic resins such as polyamides, polyethylene, polypropylene, polystyrene, acrylonitrile styrene butadiene copolymer, polyvinyl chloride, polycarbonates, polyethylene terephthalate, polybutylene terephthalate, and styrene acrylonitrile copolymer, polymer alloys consisting of these thermoplastic resins, etc.

The second resin 5 can be selected from all kinds of resins, if the elastic modulus of the second resin 5 is lower than that of the matrix resin 4. It is preferred that the elastic modulus of the second resin 5 is in a range from 0.3 to 0.9 time the elastic modulus of the matrix resin 4, since the balance between the stress relaxation and the stress transfer is good. Methods for lowering the elastic modulus include such techniques as shortening the distance between crosslinking points in the case of an epoxy resin, and narrowing the molecular weight distribution in the case of a thermoplastic resin.

The elastic modulus of the second resin 5 can be measured according to JIS K 7113, like that of the matrix resin 4. For measuring after the composite material member 1 has been formed, the micro-Vickers method or nano-indentation method can be used. The micro-Vickers method is described in JIS Z 2244 and ASTM E384. In the method, the hardnesses of the portion of the matrix resin 4 and the portion of the second resin 5 are measured, and in the case where the portion of the second resin 5 is softer, it is judged that the elastic modulus of the second resin 5 is lower. In the nano-indentation method, an instrument commercially available from, for example, Micro Photonics, USA is used to press a regular triangular pyramid-shaped indenter into the portion of the matrix resin 4 or the second resin 5, and the gradient of elastic recovery caused by unloading is used to quantitatively measure the elastic modulus.

Figure 3:
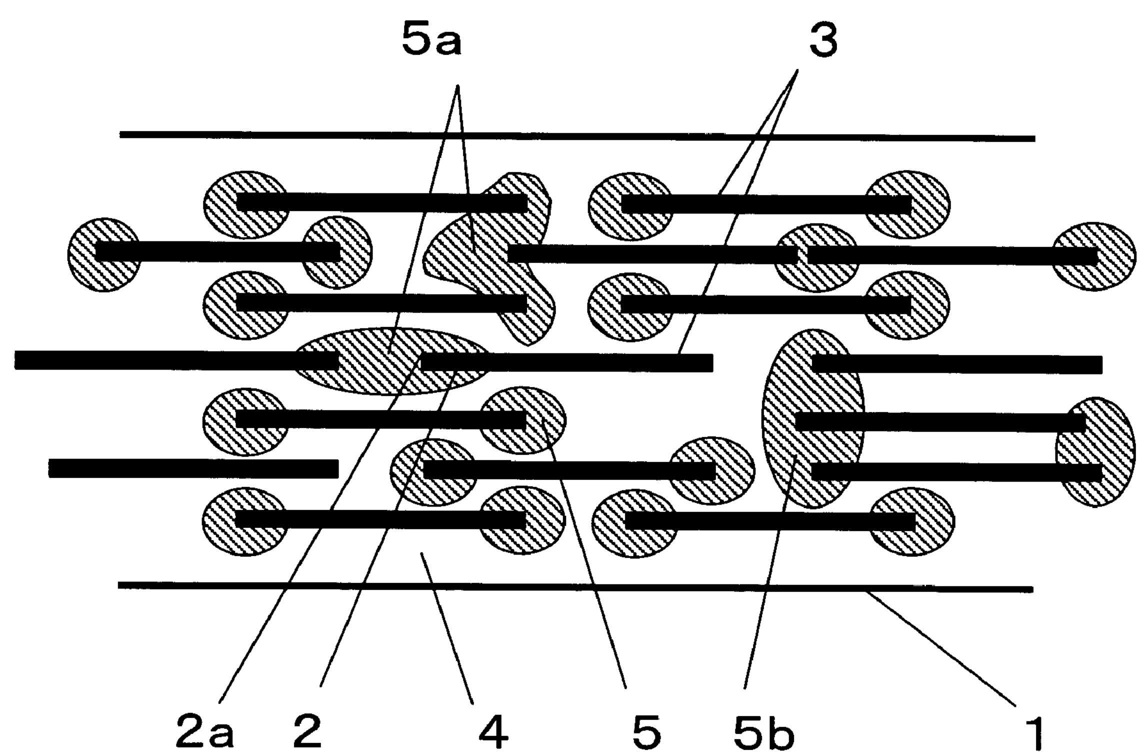
FIG. 3 is a typical view of a section in the direction perpendicular to the thickness direction showing a further other embodiment of the fiber-reinforced composite material of the invention.

As for how the second resin 5 exists, as described in reference to FIGS. 1 and 2, the second resin 5 can exist independently at the end of each single fiber (like a matchstick), or as shown in FIG. 3, the second resin can combine the fiber ends 2*a* of plural reinforcing fibers 3 as indicated by 5*a*, or can cover the entire end of a fiber bundle consisting of plural fibers such as a strand, as indicated by 5*b*.

From the viewpoint of preparing fibers having the second resin 5 adhering to them, it is preferred that the second resin exists at the end of a strand having a width of several millimeters consisting of hundreds of to hundreds of thousands of single fibers, as indicated by 5*b*. The reason is that letting the second resin 5 adhere to respective fiber bundles is more efficient than letting the resin adhere to the respective fibers individually.

How the second resin 5 exists can be confirmed by observing a section of the composite material 1 using an optical microscope. In this case, a section of the composite material 1 is ground, and the lengths of optically differently colored portions are measured. As another method, for example, the composite material is immersed in a solvent capable of dissolving the second resin 5 alone or the matrix resin 4 alone, and the resin remaining undissolved in the composite material or the resin remaining near the fiber ends 2*a* is observed for confirming respective sizes. As a further other method, for example, in the case where the matrix resin 4 is an epoxy resin while the second resin 5 is a nylon, the fiber ends 2*a* are irradiated with ultraviolet rays, to change the color of the epoxy portions into brown, for allowing both the resins to be easily distinguished optically, and the lengths of the adhering nylon resin can be measured. As a still further other method, infrared analysis can also be used to detect a component contained in the matrix resin 4 and not contained in the second resin 5.

As for the methods for letting the second resin 5 adhere to the fiber end portions 2 of the reinforcing fibers 3, the second resin 5 can be fused to the fiber end portions 2, or the second resin 5 can also be converted into a powder for allowing it to adhere to the fiber end portions 2 directly using its electrostatic or adhesive property. As a further other method, for example, the resin destined to be the second resin 5 is made to adhere to certain length portions of reinforcing fibers or reinforcing fiber bundles in the longitudinal direction, and the fibers or fiber bundles are cut or broken at the adhering portions for obtaining fibers or fiber bundles having fiber end portions with the second resin 5 adhering to them on one side or on both sides.

As described before, the second resin 5 can also be made to adhere to the fiber end portions 2, by applying a substance capable of reacting with the matrix resin 4 for lowering the elastic modulus of the matrix resin 4, to near the fiber end portions 2. For example, a curing inhibitor or a softening agent for lowering the crosslinking density of the matrix resin 4 is applied to the fiber end portions 2 of the reinforcing fibers, to lower the elastic modulus. More particularly, in the case where the matrix resin 4 is an epoxy resin, if water is deposited at the fiber end portions 2, the curing of the epoxy resin can be inhibited, and the elastic modulus of the matrix resin in the portions near the fiber end portions 2 can be lowered compared with that of the matrix resin 4 in the other portions.

Moreover, in the case of the autoclave or hand lay-up molding method in which sheets obtained by cutting a unidirectional prepreg or woven fabric are overlaid on each other or butted to each other for lamination, the second resin 5 can also be applied to the fiber end portions 2 using a brush or the like. It is also desirable that the second resin 5 is adhesive and is made to adhere to the fiber end portions 2 beforehand, for preventing that the reinforcing fibers 3 are scattered due to wind or the like, or shift from predetermined positions.

If the elongation and the strength of the second resin 5 are larger, fracture can be more effectively inhibited, allowing the member 1 to have a higher strength, like the matrix resin 4. Moreover, in the case where the fracture toughness value of the second resin 5 is larger, even if a crack is formed, the propagation of the crack can be inhibited to improve durability such as fatigue resistance.

It is preferred that the particular elastic modulus of the second resin 5 is in a range from 0.8 to 5 GPa. If the elastic modulus is lower than the lower limit, the stress transferred from the second resin 5 to the reinforcing fibers 3 is very small, and it can happen that the strength of the member 1 cannot be sufficiently enhanced. If the elastic modulus is higher than the upper limit, it is difficult to select the resin for the matrix resin 4, and it can happen that the cost is raised. A more preferred range of the elastic modulus of the second resin 5 is from 1.0 to 4 GPa.

Furthermore, it is preferred that the elongation of the second resin 5 is in a range from 2 to 50%, larger than that of the reinforcing fibers 3, and that the strength of the second resin 5 is in a range from 2 to 100 MPa. If the elongation is smaller than the lower limit, it is lower than the elongation of the reinforcing fibers 3, and it can happen that the second resin 5 is fractured earlier than the reinforcing fibers 3. If the elongation is higher than the upper limit, the reinforcing fibers 3 are fractured earlier wastefully. If the strength is lower than the lower limit, it can happen that the second resin 5 is fractured earlier than the reinforcing fibers 3. If the strength is higher than the upper limit, the cost of the member 1 rises since the cost of the second resin 5 rises.

Since the second resin 5 having an elastic modulus lower than that of the matrix resin 4 exists near the fiber end portions 2 of the reinforcing fibers 3 having the fiber ends 2*a* to relax the stress concentration, the fracture of the member 1 can be prevented or retarded, allowing the member 1 to have a high strength. On the other hand, since both the second resin 5 and the matrix resin 4 are resins, the member 1 can be kept light in weight.

It is preferred that the rate of the reinforcing fibers 3 having the second resin 5 adhering to near the fiber end portions 2 among the reinforcing fibers 3 having fiber ends 2*a* is 30% or more based on the quantity of all the reinforcing fibers 3 having the fiber ends 2*a*. If the rate is less than 30%, the degree in the improvement of strength is within the scope of fluctuation, and the improvement may not be able to be identified. It is more preferred that more than one half of the reinforcing fibers 3 having fiber ends 2*a* have the second resin 5 adhering to near their fiber end portions 2. Furthermore, in the case of a structural member for a motor vehicle or aircraft, since higher reliability is required, it is preferred that the rate of the reinforcing fibers having the second resin 5 adhering to near the fiber end portions 2 among the reinforcing fiber 3 having the fiber ends 2*a* is 80% or more based on all the reinforcing fibers 3 having the fiber ends 2*a*.

Preferred molding methods for producing the member composed of the fiber-reinforced composite material 1 of the invention include SMC (sheet molding compound) and BMC (bulk molding compound), P4 (N. G. Chavka, et al., "P4: Glass Fiber Preforming Technology for Automotive Applications," 44th International SAMPE Symposium, May 23–27, 1999), etc.

BMC refers to a bulk-like intermediate base material formed by mixing reinforcing fibers 3 having fiber ends 2*a*, cut to have a length of about 10 to about 30 mm, with a matrix resin.

P4 is also a reinforced base material containing fibers having fiber ends 2*a*, with a length of 70 to 200 mm, as reinforcing fibers 3, like SMC and BMC. The base material allows the fibers to be controlled in orientation (for example, the fibers can be arranged in one direction), and can be used for producing a composite material having a higher strength.

EXAMPLES

Examples of the invention are described below.

Example 1

Seven plies of a unidirectional carbon fiber prepreg (containing 59 vol % of carbon fibers) containing carbon fibers (elastic modulus: 235 GPa, strength: 4.9 GPa, fiber diameter: 8 μm) as the reinforcing fibers 3 and an epoxy resin (elastic modulus: 3.5 GPa, elongation: 5%, strength: 80 GPa, fracture toughness value: 80 J/m$^2$) as the matrix resin 4 were laminated in one direction, to prepare a fiber-reinforced composite material 1. In this case, the central one ply of the seven plies was cut in the direction (width direction) perpendicular to the fiber direction of the reinforcing fibers 3 using a cutter, to form fiber ends 2*a*, and a second resin 5 was made to adhere to the fiber ends 2*a* over a length of 0.5 mm. The second resin 5 was a nylon resin (elastic modulus: 1.8 GPa, elongation: 40%, strength: 40 MPa, fracture toughness value: 180 J/m$^2$), and it was made to adhere to near the fiber end portions 2 in a fused state. From the obtained composite material 1, a tensile specimen (width: 10 mm, length: 250 mm, thickness: 1 mm, position of fiber ends 2*a*: at the center in the length direction, weight: 40 g) was prepared. The obtained tensile specimen was used for carrying out a tensile test according to JIS K 7073.

The specimen was tensile-tested at a tensile speed of 2 mm/min, and as a result, the tensile strength was found to be 2,500 MPa. The fractured state of the specimen was observed after completion of the tensile test, and the fracture state showing a broom like fracture mode that is not so greatly different from that of a continuous fiber-reinforced composite material was observed. Though the fiber-reinforced composite material had fiber ends in it, the obtained fiber-reinforced composite material had a lightweight and a high strength.

Comparative Example 1

A fiber-reinforced composite material was produced as described for Example 1, except that the fiber ends 2*a* formed by cutting the central one ply had no second resin 5 adhering to near the fiber end portions 2, and a tensile specimen was prepared from it similarly. The weight of the specimen was 40 g. As a result, the tensile strength was 2,310 MPa. The fractured state of the specimen was observed after completion of the tensile test, and found to show a fracture extending in the width direction of the specimen at the center of the specimen, i.e., at the portion where the cut fiber ends 2*a* existed.

Example 2

A fiber-reinforced composite material 1 was produced as described for Example 1, except that a mixture consisting of 95 parts by weight of the same epoxy resin as used in Example 1 and 5 parts by weight a polyether sulfone resin (PES) was used as the second resin 5, and that the adhering length was 0.3 mm. A tensile specimen was prepared as described in Example 1. As a result of a tensile test, the strength was 2,440 MPa. The weight of the specimen was 40 g. The elastic modulus, elongation and strength of the second resin 5 measured according to JIS K 7113 were respectively 2.5 GPa, 5% and 60 MPa, and the fracture toughness value of the second resin 5 measured based on ASTM E399 (Compact Test Standard) was 210 J/m$^2$.

Example 3

A carbon fiber bundle consisting of 240,000 carbon fibers (elastic modulus: 240 GPa, strength: 5.0 GPa, fiber diameter: 7 μm) was cut to have a length of 24 to 25 mm using a rotary cutter, to produce a short carbon fiber bundle. The same nylon resin (second resin 5) as used in Example 1 was made to adhere to both the ends of the obtained short carbon fiber bundle in length ranges of 0.5 to 1 mm from the fiber ends 2*a* in a fused state. The short carbon fiber bundle having the second resin 5 adhering to it was dispersed at random on a vinyl ester resin film, to produce an SMC sheet (fiber areal weight: 1,200 g/m$^2$). Two such SMC sheets were overlaid, and the laminate was pressurized (50 atmospheric pressure) and heated (110° C.) for being molded in a box-shaped mold (150 mm×150 mm, 20 mm deep) installed in a press. During the molding, the reinforcing fibers in the SMC were virtually uniformly spread, and a box-shaped short carbon fiber-reinforced composite material 1 having a thickness of 1.8 to 1.9 mm was obtained. The specific weight of the material 1 was 1.55.

From the obtained composite material 1, a tensile specimen (length: 250 mm, width: 25 mm) was cut out, and a tensile test was carried out according to JIS K 7073. The strength of the specimen was 550 MPa. The fractured state of the specimen was observed using an electron microscope, and as a result, it was confirmed that the respective fibers had been substantially uniformly fractured.

Comparative Example 2

An SMC sheet was produced as described for Example 3, except that nothing, i.e., no second resin was made to adhere to either end of the short carbon fiber bundle, and a box-shaped short fiber-reinforced composite material was produced by means of press molding. The reinforcing fibers were virtually uniformly spread as in Example 3, and a box-shaped short carbon fiber-reinforced composite material having a thickness of 1.8 to 1.9 mm was obtained. The specific gravity of the material was 1.55.

From the obtained composite material, a tensile specimen was cut out as in Example 3, and a tensile test was carried out as in Example 3. The strength of the specimen was 230 MPa. The fractured state of the specimen was observed with an SEM, and as a result, it was confirmed that the fibers had pulled out in the fractured face.

Example 4

An SMC sheet was produced as described for Example 3, except that the same nylon resin (second resin 5) as used in Example 1 was made to adhere to only one of the ends of the cut short carbon fiber bundle, and a short carbon fiber-reinforced composite material 1 having a thickness of 1.8 mm and a specific gravity of 1.55 was obtained by means of press molding.

The obtained composite material 1 was tensile-tested as described for Example 3, and as a result, the strength of the specimen was 400 MPa.

Example 5

The short carbon fiber bundle having the second resin 5 adhering to it obtained in Example 3 was arranged in one direction, to produce a mat (fiber areal weight 300 g/m$^2$). Six such mats were laminated, and impregnated with an epoxy resin by means of resin transfer molding (RTM), and the epoxy resin was cured to obtain a 2.0 mm thick short carbon fiber-reinforced composite material 1. The epoxy resin used as the matrix resin 4 had an elastic modulus of 3.5 GPa, a strength of 70 MPa, an elongation of 4% and a fracture toughness value of 85 J/m$^2$.

From the obtained composite material 1, a tensile specimen (length: 250 mm, width: 25 mm) was cut out, and tensile-tested according to JIS K 7073. The tensile specimen had a strength of 770 MPa and a specific gravity of 1.6. The fractured state of the specimen was observed with an electron microscope, and as a result, it was confirmed that the fibers had not pulled out from the fractured face and had been substantially uniformly fractured.

Example 6

A model test of reinforcement of the fiber end portions 2 by the second resin 5 was carried out. A 12.5 mm wide, 230 mm long and 0.2 mm thick carbon fiber prepreg having carbon fibers arranged in the longitudinal direction was produced. Seven plies of the prepreg were laminated in the same direction. In this case, the central one ply of the seven plies was cut in the direction (width direction) perpendicular to the fiber direction at the center, and a second resin 5 having an elongation higher than that of the matrix resin (epoxy resin) 4 of the prepreg was made to adhere to the cut portions to cover the cut faces in 0.5 mm length ranges from the cut faces. From the obtained prepreg, a tensile specimen was prepared based on JIS K 7073, and a tensile test was carried out. The tensile strength was about 2,450 MPa.

The second resin 5 used was produced by kneading 5 parts by weight of a nylon resin (elongation 250%) with 95 parts by weight of the same epoxy resin as the matrix resin 4 to have a higher elongation. The elongation of the matrix resin 4 was 5%, and the elongation of the second resin 5 was 15%.

Example 7

A model test of reinforcement of the fiber end portions 2 by the second resin 5 was carried. A 12.5 mm wide, 230 mm long and 0.2 mm thick carbon fiber prepreg with carbon fibers arranged in the longitudinal direction was produced, and seven plies of the prepreg were laminated in the same direction. In this case, the central one ply of the seven plies was cut in the direction (width direction) perpendicular to the fiber direction at the center, and a second resin 5 having a strength higher than that of the matrix resin (epoxy resin) 4 of the prepreg was made to adhere to the cut portions, to cover the cut faces in 0.5 mm length ranges from the cut faces. From the obtained prepreg, a tensile specimen was prepared based on JIS K 7073, and a tensile test was carried out. The tensile strength was about 2,480 MPa.

The second resin 5 used was produced by kneading 3 parts by weight of CF milled yarns with 97 parts by weight of the same epoxy resin as the matrix resin 4, to have a higher strength. The matrix resin 4 had the strength of 85 MPa, and the second resin 5 had the strength of 108 MPa.

Comparative Example 3

A 12.5 mm wide, 230 mm long and 0.2 mm thick carbon fiber prepreg with carbon fibers arranged in the longitudinal direction was produced, and seven plies of the prepreg were laminated in the same direction. In this case, the central one ply of the seven plies was cut in the direction (width direction) perpendicular to the fiber direction at the center, and no second resin was used to reinforce the cut portions. That is, the cut portions were directly positioned in the matrix resin. From the obtained prepreg, a tensile specimen was prepared based on JIS K 7073, and a tensile test was carried out. The tensile strength was about 2,200 MPa.

Comparisons between Examples 6 and 7 and Comparative Example 3 are shown in Table 1.

TABLE 1

| | | Example 6 | Example 7 | Comparative Example 3 |
|---|---|---|---|---|
| Resin used for reinforcing the cut portions | Amount (parts by weight) | Epoxy resin 95 Nylon resin 5 | Epoxy resin 97 CF milled yarns 3 | Epoxy resin 100 — |
| | Strength (MPa) | 83 | 108 | 85 |
| | Elongation (%) | 15 | 5 | 5 |
| Matrix resin | Amount (parts by weight) | Epoxy resin 100 | Epoxy resin 100 | Epoxy resin 100 |
| | Strength (MPa) | 85 | 85 | 85 |
| | Elongation (%) | 5 | 5 | 5 |
| Tensile strength (MPa) | | 2,450 | 2,480 | 2,200 |

INDUSTRIAL APPLICABILITY

The fiber-reinforced composite material of the invention has a second resin having an elastic modulus lower than that of the matrix resin adhering to at least some of the end portions of the reinforcing fibers existing in the fiber-reinforced composite material. It, therefore, has a structure to relax the stress concentration occurring near the end portions of the reinforcing fibers caused by the external forces acting on the composite material. As a result, a high-strength fiber-reinforced composite material excellent in the capability of being transformed can be provided even though it has a lightweight.

The invention claimed is:

1. A fiber-reinforced composite material comprising:

a matrix resin, reinforcing fibers having fiber ends, wherein at least some of the fiber ends are in the matrix resin, and a second resin having an elastic modulus lower than that of the matrix resin surrounded by the matrix resin and in contact with and only near at least some of the fiber ends, wherein elongation of the matrix resin is greater than that of the reinforcing fibers.

2. The fiber-reinforced composite material, according to claim 1, wherein the second resin exists in the range of 30 times to 1,000 times of a diameter of the fiber at the fiber end portions from the fiber end of the fiber end portion.

3. The fiber-reinforced composite material, according to claim 2, wherein the elongation of the second resin is higher than the elongation of the matrix resin.

4. The fiber-reinforced composite material, according to claim 2, wherein the strength of the second resin is higher than that of the matrix resin.

5. The fiber-reinforced composite material, according to claim 2, wherein the fracture toughness value of the second resin is larger than that of the matrix resin.

6. The fiber-reinforced composite material, according to claim 1, wherein the reinforcing fibers are carbon fibers.

7. A fiber-reinforced composite material, according to claim 1, wherein the matrix resin is an epoxy resin.

8. A method of producing a fiber-reinforced composite material comprising:

introducing reinforcing fibers having fiber ends into a matrix resin such that at least some of the fiber ends are in the matrix resin, positioning a second resin having an elastic modulus lower than that of the matrix resin within the matrix resin and in contact with and only near the fiber ends of at least some of the reinforcing fibers, and molding the reinforcing fiber, matrix resin and second resin into the fiber-reinforced composite material, wherein elongation of the matrix resin is greater than that of the reinforcing fibers.

9. The method according to claim 8, wherein the reinforcing fibers are short fibers having a length of 6 to 30 mm and the method further comprises letting the second resin adhere in contact with and only near fiber ends of the short fibers, molding the short fibers having the second resin adhering thereto and the matrix resin into a sheet, and pressurizing and heating the formed sheet for curing the resin.

10. The method according to claim 8, wherein the reinforcing fibers are continuous fibers having cut ends, and the method further comprises letting the second resin adhere in contact with and only near cut ends of the continuous fibers, the step of transforming continuous fibers having the second resin adhering thereto, into a shape of a member, injecting the matrix resin into the transformed continuous fibers, and curing the matrix resin of the molded article.

11. The method according to claim 8, further comprising: cutting a prepreg comprising the reinforcing fibers and the matrix resin, letting the second resin adhere in contact with and only near the fiber ends, laminating plural sheets of a prepreg having the second resin adhering thereto, and curing the second resin of the laminated prepreg in an autoclave.

12. The method according to claim 8, wherein the reinforcing fibers are carbon fibers.

13. The method according to claim 8, wherein the matrix resin is an epoxy resin.

* * * * *